July 23, 1929.   G. L. HAMMOND ET AL   1,721,905
MACHINE FOR CUTTING BELTS AND RINGS FROM TUBULAR STOCK
Filed Sept. 9, 1926   6 Sheets-Sheet 1

INVENTORS
Guy L. Hammond and
Lester H. Messinger, Jr.
BY
Chamberlain & Newman
ATTORNEYS July 23, 1929.  G. L. HAMMOND ET AL  1,721,905

MACHINE FOR CUTTING BELTS AND RINGS FROM TUBULAR STOCK

Filed Sept. 9, 1926  6 Sheets-Sheet 2

INVENTORS
Guy L. Hammond and
Lester H. Messinger, Jr.
BY
Chamberlain & Newman
ATTORNEYS

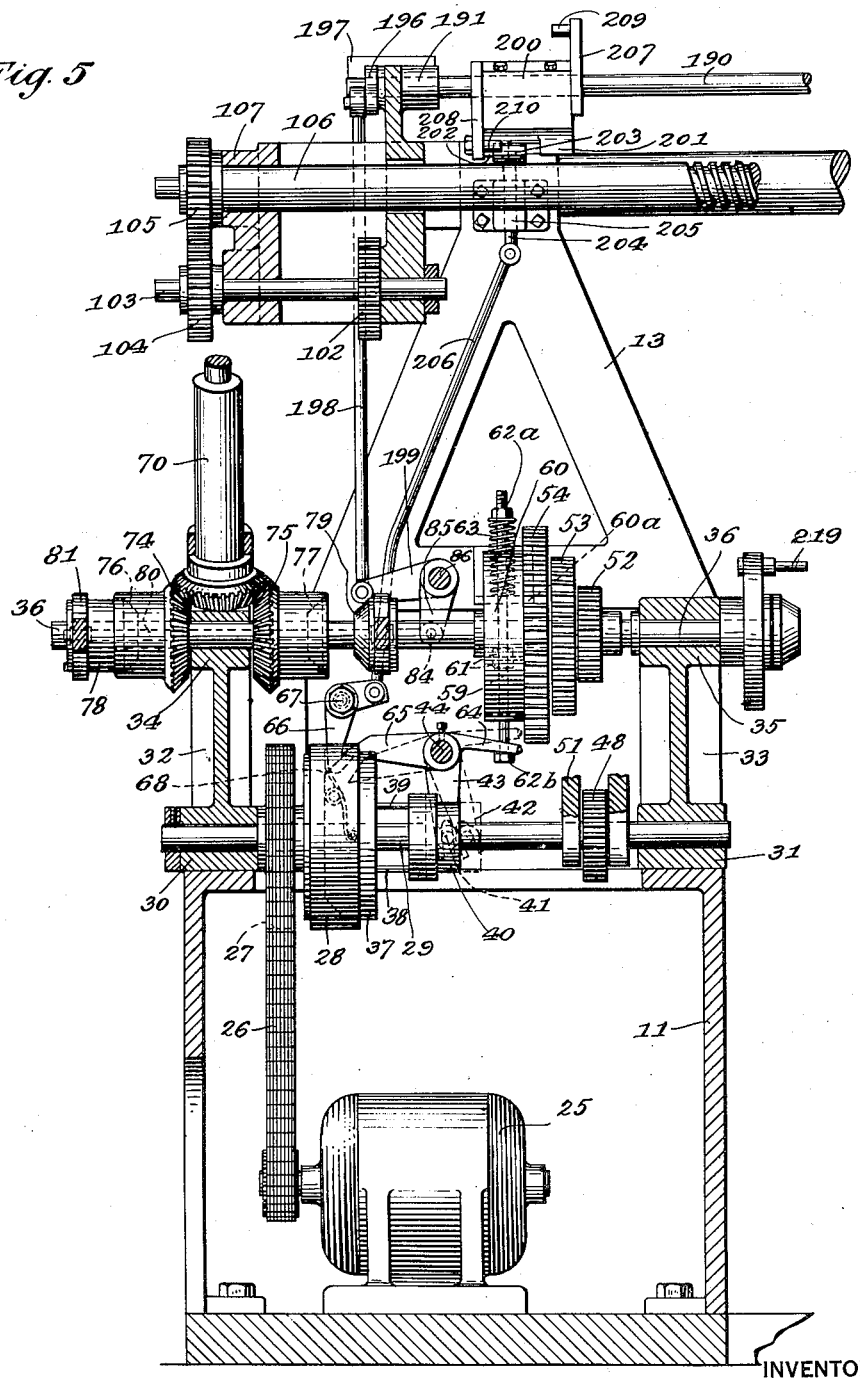

July 23, 1929.  G. L. HAMMOND ET AL  1,721,905
MACHINE FOR CUTTING BELTS AND RINGS FROM TUBULAR STOCK
Filed Sept. 9, 1926  6 Sheets-Sheet 4
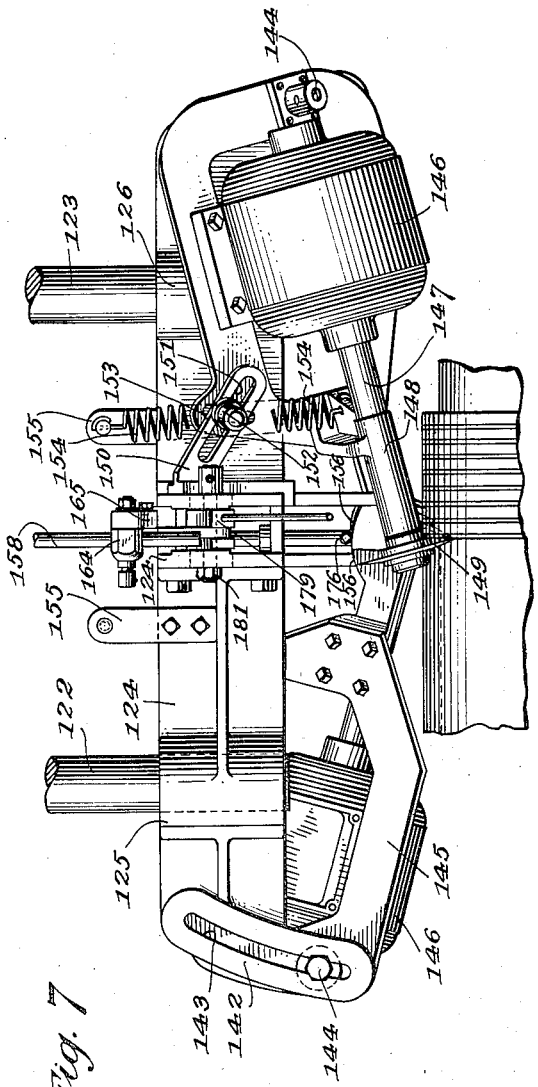
INVENTORS
Guy L. Hammond and
Lester H. Messinger, Jr.
BY
Chamberlain + Newman
ATTORNEYS

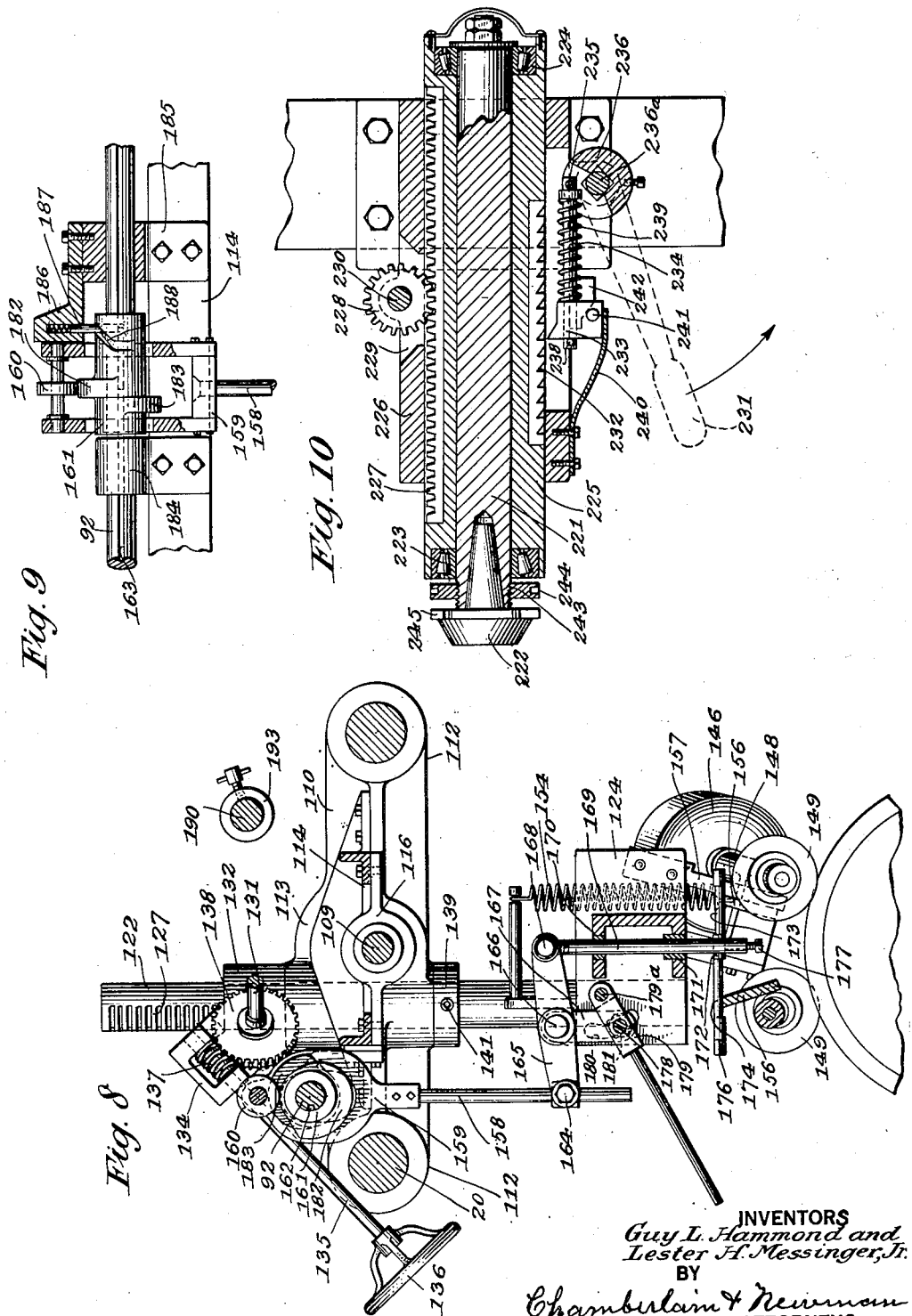

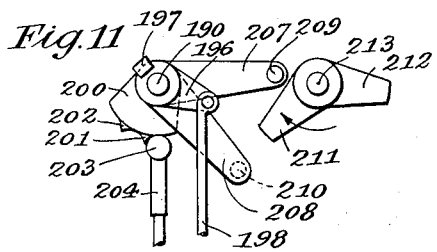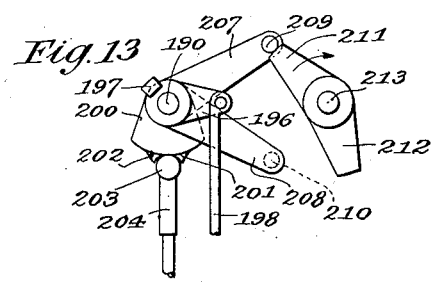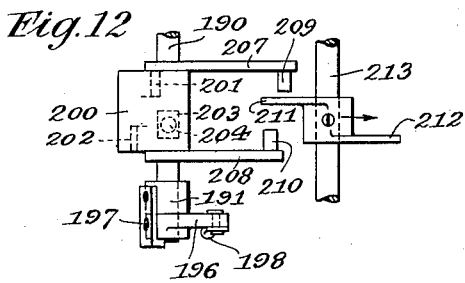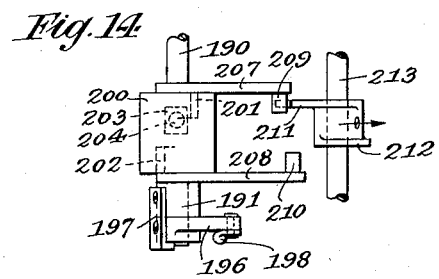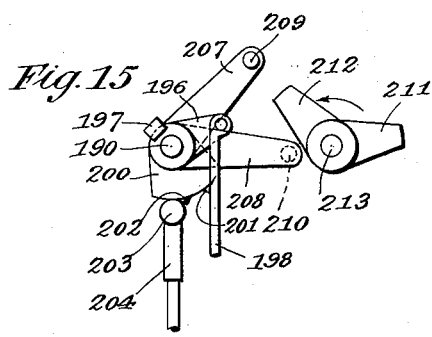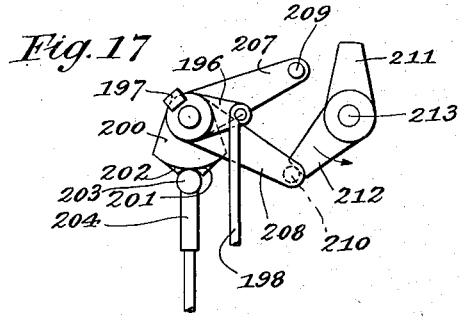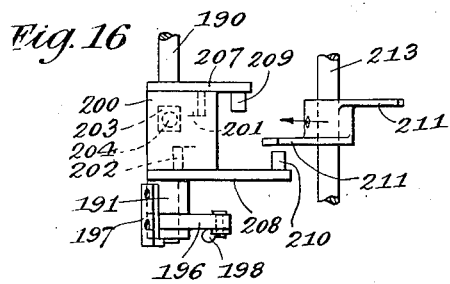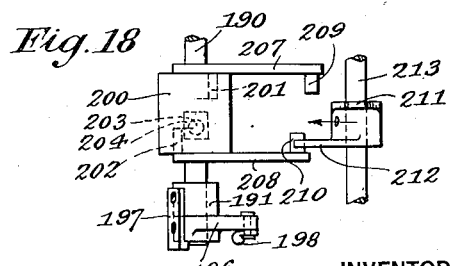
INVENTORS
Guy L. Hammond and
Lester H. Messinger, Jr.
BY Chamberlain & Newman
ATTORNEYS Patented July 23, 1929.

1,721,905

UNITED STATES PATENT OFFICE.

GUY L. HAMMOND AND LESTER HUBERT MESSINGER, JR., OF BRIDGEPORT, CONNECTICUT, ASSIGNORS TO THE BLACK ROCK MANUFACTURING COMPANY, OF BRIDGEPORT, CONNECTICUT, A CORPORATION OF CONNECTICUT.

MACHINE FOR CUTTING BELTS AND RINGS FROM TUBULAR STOCK.

Application filed September 9, 1926. Serial No. 134,361.

The present invention relates to a machine for cutting belts, rings or the like, from a tube of rubber or other suitable material, and particularly V-belts adapted for use as continuous drive belts or the like, and it is an object of the invention to provide cutting means adapted to produce rings having a cross section of substantially V-shape, to the end that the belt is adapted to fit the groove of a pulley, as is usual with such belts. The rubber tubes from which the belts are cut are preferably a special composition reinforced rubber so that the belts are very tough and substantially non-stretching.

It is also proposed to provide a novel cutting means by which the cross section of the belt, in addition to being substantially V-shape, will be provided with beveled surfaces at each side adjacent the outer cylindrical surface.

It is also a feature of the invention to provide a machine upon which plain rings, having either straight right-angle side edges or beveled edges, as are commonly employed as fruit jar rings, packing rings and the like may be cut.

A further object is to provide such a machine by which the cutting operation may be carried on successively along the length of a tube of rubber, or the like, in such manner that the rings cut therefrom will be accurately cut to uniform sizes, and further to provide a machine adapted, by adjustment, to produce rings from rubber tubes of different diameters, so that belts of different diameters, widths and cross sections may be produced.

A further object is to provide automatic stop means adapted to be actuated at the end of the cutting operation upon a single tube, and enabling another tube to be placed in the machine and thereupon cut into rings by the reverse movement of the machine.

With the above and other objects in view, an embodiment of the invention is shown in the accompanying drawings, and this embodiment will be hereinafter more fully described with reference thereto, and the invention will be finally pointed out in the claims.

Figure 3:
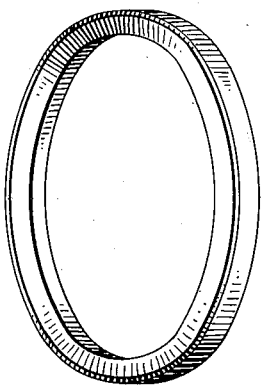
Fig. 3 is a perspective view of one of the belts produced by the machine.
Figure 4:
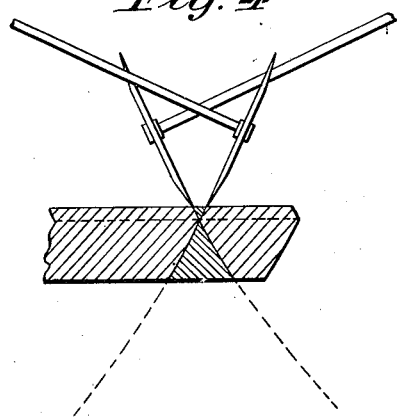
Fig. 4 is a diagrammatic view showing the relation of the cutting knives to each other and the manner in which they cut the tube to produce the beveled and V-shape cross section.
Figure 4A:
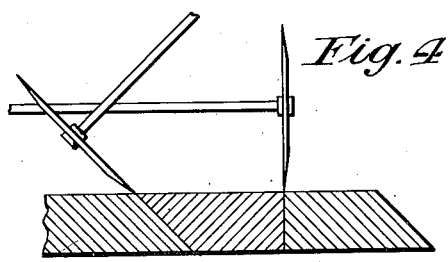

Fig. 4ª is a diagrammatic view showing the position and relation of the cutting knives for cutting belts or jar rings of different cross sections than that shown in Figs. 3 and 4, and showing one side edge portion cut at a right angle, and the other beveled.

Figure 1:
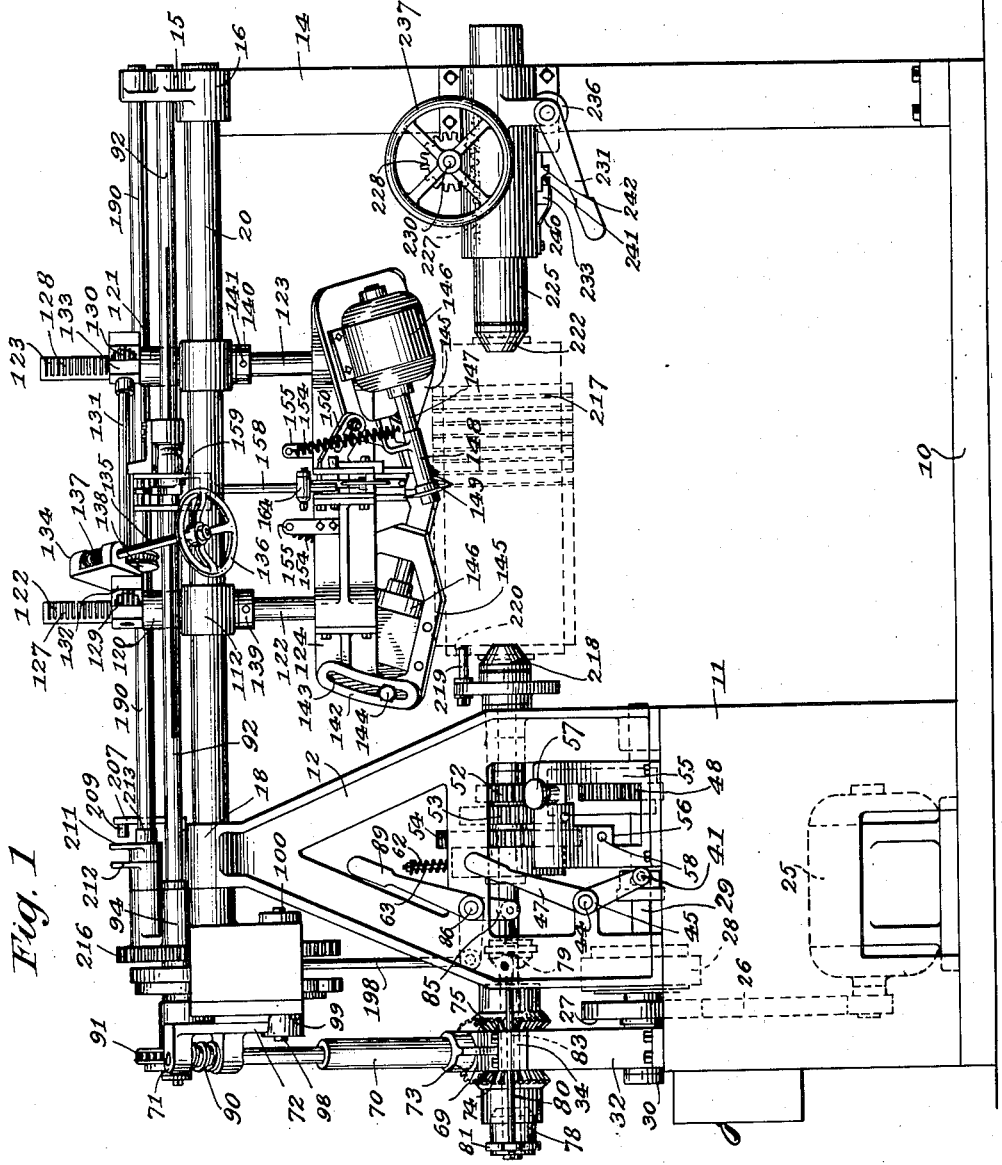
Fig. 1 is a front elevation of a rubber cutting machine according to the present embodiment of the invention, and showing the rubber tube and its supporting mandrel in dotted lines.
Figure 2:
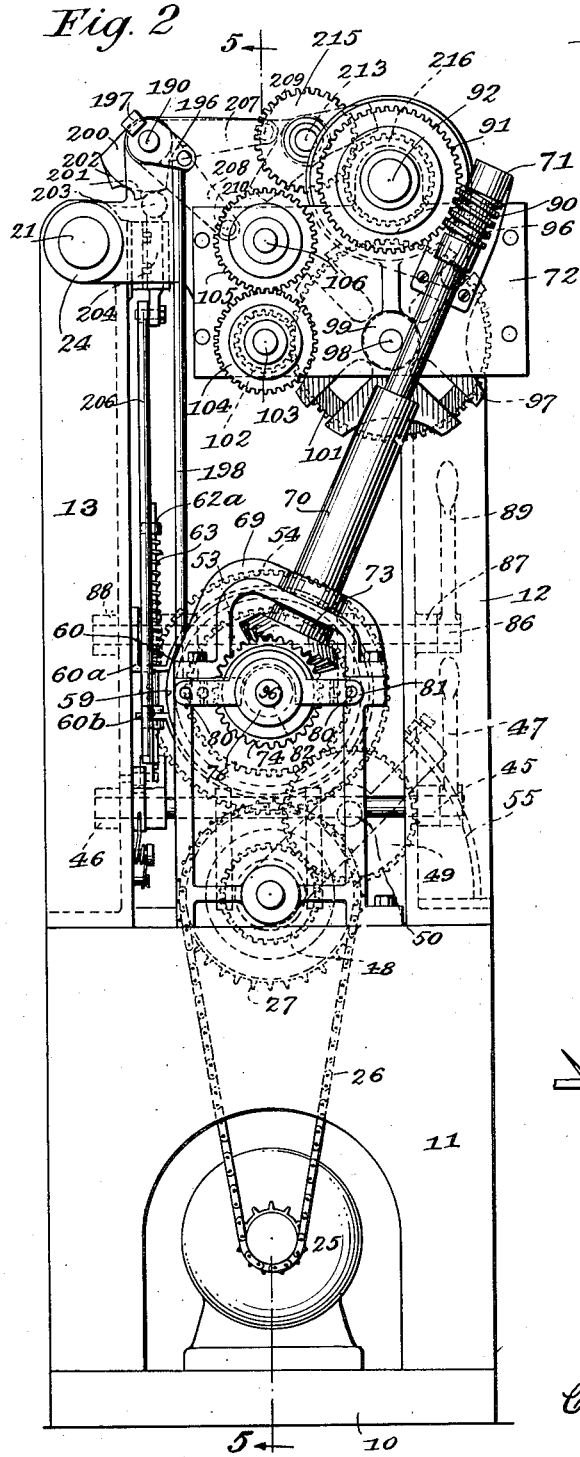
Fig. 2 is an end elevation of the same, enlarged.

Fig. 5 is a vertical sectional view at one end of the machine and taken along the line 5—5 of Fig. 2;

Fig. 6 is a top plan view of the machine;

Fig. 7 is an enlarged front elevation of the cutting knives and their supporting frame;

Fig. 8 is a vertical sectional view, enlarged, of the cutting knife mechanism;

Fig. 9 is a detail view of the cam mechanism for raising and lowering the cutting knives;

Fig. 10 is an enlarged detail longitudinal sectional view of the adjustable supporting tail-stock for supporting the rubber tube carrying mandrel;

Figs. 11 and 12, 13 and 14, 15 and 16, and 17 and 18 are, respectively, diagrammatic end and plan views of the stop mechanism employed, and showing, respectively, the position during travel of the carriage to the left, the actuated neutral position at the end of the travel to the left, the position during travel of the carriage to the right, and the actuated neutral position at the end of the travel to the right.

Similar reference characters indicate corresponding parts throughout the several figures of the drawings.

Referring to the drawings, the rubber belt cutting machine, according to the present embodiment of the invention, comprises a frame consisting of a base 10 provided at one end with a substantially rectangular motor housing 11, on the upper side of which and adjacent its forward and rearward edges there are secured vertical standards 12 and 13 of substantially A-shape, and at the other end of the base there is secured a vertical standard 14 disposed in spaced relation to the standards 12 and 13, and provided at its upper end with a horizontal cross head 15 provided in each end with cylindrical bearing portions 16 and 17 disposed in axial alignment with cylindrical bearing portions 18 and 19 at the upper ends of standards 12 and 13, and in which cylindrical bearing portions there are supported the ends of parallel carrier supporting bars 20 and 21 upon which the knife supporting carrier is mounted for longitudinal sliding movement, as will hereinafter more fully appear. The bars 20 and 21 are projected at one end with respect to the bearings 18 and 19 and upon these projecting ends there is supported a gear frame 22 provided with cylindrical tubular bosses 23 and 24 at each end which are engaged upon and secured to said projected ends of the bars.

Within the motor casing 11 there is mounted upon the base 10 an electric motor 25, which through a sprocket chain 26 is adapted to drive the sprocket gear 27 of a clutch 28, loosely rotatable upon a drive shaft 29 journaled at its ends in bearing portions 30 and 31 of standards 32 and 33 secured upon the upper side of the motor casing 11 adjacent the respective outer and inner ends thereof. At the upper ends of the standards 32 and 33 there are provided bearing portions 34 and 35 in which are journaled the ends of a spindle shaft 36 adapted through suitable gearing, presently to be more fully described, to be driven from the shaft 29.

The clutch 28 is adapted to be engaged by a slidable cone-clutch 37 slidably keyed upon the shaft 29, and connected by rods 38 and 39 to a collar 40 provided with diametrically opposed horizontally disposed pins 41, engaged by the forked ends 42 of a pair of shift levers 43 secured upon a horizontal transverse shaft 44, journaled at its ends in bearing bosses 45 and 46 in the respective standards 12 and 13, and provided upon one end with a hand lever 47 for shifting the clutch into engagement. A gear 48 is slidably keyed upon the shaft 29 and meshes with an idler gear 49 rotatably mounted on a stud shaft 50 of a forked arm 51 pivoted upon the shaft 29 at each side of the gear 48, said gear 49 adapted to be meshed with one or the other of a plurality of different diameter gears 52, 53 and 54 secured upon the shaft 36. The gear 49 is selectively meshed with these gears by swinging the arm 51 to disengage it from one, and sliding the same together with the gear 48 upon the shaft 29, whereupon said gear 49 may be swung into mesh with any one of said gears, the arm being secured in adjusted relation by engagement of its end through a slotted arcuate plate 55 secured upon the base of the standard 11 and provided with stepped slot portions 56 with which the arm 51 is adapted to be respectively locked by means of a spring pressed pin 57 adapted to engage in one of a series of holes 58 in the plate 55.

Referring more particularly to Figs. 2 and 5, it will be seen that adjacent the gear 54 there is provided a brake drum 59 about which there is disposed a brake band 60 having one end $60^a$ secured to the inner side of the standard 13 and having its other end secured by lock-nuts 61 to a vertical rod 62 slidably extending through the apertured connecting portions $60^b$ between the secured end $60^a$ and the circular portion of the band, and provided above said portion $60^a$ with a spring 63 engaged at its upper end by means of a nut $62^a$ screwed upon the threaded upper end of said rod. At the lower end, the rod is provided with a head $62^b$ engaged beneath the slotted end of a forked lever 64 secured upon the shaft 44. The brake-band is thus released from the drum 59 when the shaft 44 is turned in clockwise direction to engage the clutch 37, to thereby permit free rotation of the shaft 36, and upon disengagement of the clutch, disconnect the drive shaft 29, the brake is applied through the action of the spring 63 to arrest the rotation of the spindle shaft 36.

There is also secured upon the shaft 44 a pawl 65 adapted upon the clockwise movement to clutch engaging position of the shaft 44 to engage with a hooked latch 66 pivotally mounted upon the standard 13 at 67 and normally pressed toward the shaft 44 by means of a spring 68. It will thus be seen that as the shaft 44 is moved in clockwise direction the pawl 65 engages with the latch 66 and the clutch is thereby secured in engaged relation. At the end of the traverse of the cutting mechanism in one direction, stop means are adapted to be operated to automatically release the latch 66 and thereby stop the machine. These means will be hereinafter more fully described in connection with the description of the cutter mechanism.

Upon the upper side of the standard 32 there is secured a yoke-shaped bearing fixture 69 in which there is journaled one end of a diagonally disposed drive shaft 70 journaled at its upper end in a bearing bracket 71 secured upon the cover plate 72 of the gear frame 22. Upon the lower end of this shaft, and within the yoke-shaped bearing fixture 69, there is secured a beveled gear 73 which meshes with beveled gears 74 and 75 loosely rotatable upon the shaft 36 at each side of the bearing portion 34. Within the hub portions of these gears 74 and 75 there are provided cone-shaped clutch engaging recesses 76 and 77, adapted to be respectively engaged by cone-clutches 78 and 79 slidably keyed upon the shaft 36, and connected to move with each other by means of a shift frame 80 having cross ends 81 engaged in annular shouldered recesses 82 of the respective clutches, the longitudinal side portions of said shift frame being slidable through guide passages 83 in the upper portion of the standard 32. At the inner end of said shift frame and at each side of the shaft 36, there are secured studs 84 which are engaged by the forked ends of rock levers 85, secured upon a horizontal transversely disposed shaft 86 disposed above the spindle shaft 36 and journaled at its ends in bearing bosses 87 and 88 formed in the standards 12 and 13 being provided upon one end with a hand lever 89. By turning the shaft 86 in one or the other direction either the clutch 78 or the clutch 79 is engaged with one or the other of the respective gears 74 and 75, which gear is thereupon rotated by the shaft 36 and drives the diagonal shaft 70, the rotation being in one or the other direction depending upon as one or the other of said gears 74 and 75 is connected.

The shaft 70 is adapted through mechanism now to be described to drive the feed mechanism for the cutter knife carrier, the rotation in one direction adapted to feed the carrier in one direction and the rotation in the other direction adapted to feed the carrier in return direction. At the end of each traverse, automatic means hereinafter referred to, is operated to rotate the shaft 86 to a neutral position thereby disengaging either clutch 78 or 79, the machine being restarted at the end of each traverse.

Upon the upper end of the shaft 70 there is provided a worm 90 which meshes with a worm gear 91 secured upon the end of a shaft 92 journaled at one end in bearing portions 93 and 94 of the gear frame 22, and at its other end in a bearing portion 95 provided in the cross head 15 of the standard 14. Upon the shaft 92 there is secured within the gear frame 22 the constantly rotating element 96 of a Geneva movement, the other element 97 of which is secured upon a horizontal shaft 98 disposed directly beneath the shaft 92 and journaled in suitable bearings 99 and 100 of the gear frame 22. Upon the shaft 98 there is also secured within the gear frame 22 a gear 101, which meshes with a pinion 102 provided upon a shaft 103, journaled in suitable bearing portions in the end walls of the gear frame 22 and provided upon its forwardly projecting end with a gear 104, which meshes with a gear 105 mounted upon the end of a shaft 106, disposed directly above the shaft 103 being journaled at one end in a suitable bearing portion 107 of the gear frame 22 and at its other end in a bearing portion 108 in the cross head 15 of the standard 14. This shaft 106 is the feed shaft for moving the cutter knife carrier longitudinally, and, for this purpose, is provided with a feed thread 109. It is obvious that during operation of the machine and rotation of the shaft 70 in one direction, the longitudinal shaft 92 is continuously driven, and that the shaft 106 is intermittently rotated and through the feed screw 109 intermittently moves the cutter knife carrier, this movement being a distance corresponding to the width of the belts to be cut and occurring while the cutter knives are in raised position, the cutter knives being lowered during the intermittent stationary periods of the carrier by cam means on the shaft 92, and hereinafter to be more fully referred to.

The cutter knife carrier comprises a pair of spaced horizontal cross frame end members 110 and 111, each provided at its forward and rearward ends with tubular cylindrical bearing portions 112 slidably engaged and supported upon the horizontal cylindrical bars 20 and 21, and each provided centrally with an enlargement 113 having a passage therethrough for the feed shaft 106. The frame members 110 and 111 are connected and secured together by means of a rectangular frame member 114 provided at its four corners with projecting bracket portions 115 bolted to said frame members, and having secured to its underside a pair of spaced transverse brackets 116 and 117 provided centrally with interiorly threaded nut portions 118 and 119 engaged with the thread 109 of the shaft 106.

In the cross frames 110 and 111 there are provided respectively at the forward and rearward sides of the screw shaft 106 vertically disposed cylindrical bearing portions 120 and 121, in which there are slidably engaged vertical supporting bars 122 and 123 depending beneath the members 110 and 111, and having secured at their lower ends a cutter knife carrying frame 124, provided at one end and at its forward side with a vertical bearing portion 125 in which the end of the bar 122 is secured, and provided at its other end and at the rear side with a bearing portion 126 in which the lower end of the bar 123 is secured. These bars are normally fixed with respect to the members 110 and 111, but are adapted from time to time to be vertically adjusted for purpose of raising and lowering the knives with respect to the surface of the work. For this purpose they are respectively provided with rack-teeth 127 and 128 engaged by pinions 129 and 130 mounted upon the ends of a horizontal shaft 131, having bearing at its ends in collars 132 and 133, engaged upon the rods 122 and 123 directly above the bearing portions 120 and 121. Upon the collar 132 there is provided a bracket 134 in which there is journaled the shaft 135 of a hand wheel 136, said shaft being provided within the bracket with a worm 137 which meshes with a worm gear 138 secured upon the shaft 131. This type of gearing, it will be understood, maintains the vertically adjusted position of the rods 122 and 123 through engagement of the pinions 129 and 130

130 with the rack-teeth 127 and 128 and by turning the wheel 136 said rods, together with the frame 124 and the cutting knives carried thereby, may be raised or lowered as desired. Upon the rods 122 and 123 and beneath the members 110 and 111 there are respectively provided collars 139 and 140 adapted to be fixed by means of set screws 141, and which collars normally prevent upward pressure upon the knives from affecting the fixed position of the rods, the collars, however, being loosened during the vertical adjustment of the rods.

The cutter knives and their individual supports and motors are supported at each side of the frame 124 in opposed relation, and one is mounted upon the rearward side of the frame while the other is mounted upon the forward side in such manner that the knives are engaged diagonally with the material being cut and at each side of the high point of the same. The construction of these parts is identical so that only one will be described in detail. At each end of the frame 124 there is formed an arcuate shaped depending portion 142 provided with an arcuate slot 143 disposed in a substantially diagonal line, and within each of these slots there is adjustably secured a pivot stud 144 pivotally supporting the movable cutter knife supporting frame 145, a motor 146 to the frame 145 adjacent the stud 144, its shaft 147 extending through a cylindrical bearing bracket 148 secured upon the forward end of the frame, and the circular cutter knife 149 is secured upon the projecting end of said shaft 147. The frame 145 is supported by means of a bracket 150, secured upon the frame 124 and extending in a diagonal transversely inclined direction, and within a slot 151 of which there is adjustably secured a stud 152 slidably engaged in an arcuate slot 153 in said frame 145, the bracket thereby supporting said frame and permitting it to swing about the pivot 144.

The frame 145 is adapted to be automatically depressed during the cutting operation by mechanism hereinafter to be more fully described, and between such cutting operations is held in raised relation by means of a spring 154 secured at one end to the bracket 148 and at its other end to a bracket 155 secured upon the frame 124. Between the cylindrical bearing portion of the bracket 148 and a projecting flange 156 formed integrally upon said bracket, and extending in spaced and parallel relation to said cylindrical bearing portion, there is engaged a diagonally disposed guide member 157 secured to the frame 124 and adapted to guide the direction of operating movement of the cutting knives.

The mechanism for raising and lowering the cutting knives is operated from the shaft 92, and comprises a vertical rod 158 secured at its upper end to a yoke member 159 extending about the shaft 92 and provided above said shaft with a roller 160 engaged with a cam 161, slidably mounted upon the rod 92 and rotatable therewith by means of a key 162 engaging a key slot 163 in the shaft, this cam being adapted to raise and lower the rod 158. To the lower end of said rod there is adjustably and pivotally connected at 164 a lever 165, pivotally mounted at 166 upon a vertically adjustable support 167 and pivotally connected at its other end 168 to a vertical rod 169 slidably mounted in aligned bearings 170 and 171 of the frame 124. In the lower end of the rod 169 there is supported a transverse bar 172 provided at one end with a cylindrical portion 173 eccentrically disposed with respect to the axis of the rod 172 and adapted to engage the upper surface of the flange 156 of the cutter knife frame at one side, and provided at its other end with a cylindrical portion 174 also eccentric to the axis of the rod 172 but in opposite relation to the eccentricity of the roller 173, and engaging the flange 156 of the opposed cutter knife frame.

This rod 172 is rotatably adjustable in the rod 169, being provided at its forward end with a wrench engaging portion 176, and is adapted to be secured in its adjusted position by means of a set screw 177 engaged in the end of the rod 169. It will be seen that by rotatably adjusting the rod 172 the knife at one side is raised while the knife at the other side is lowered, and in this manner the knives may be accurately adjusted so that they will have the proper cutting relation to each other.

The lever support 167 is vertically adjustable for effecting further adjustment of the knives with respect to the rubber tube, this being desirable upon angular adjustment of the cutter knife shafts 147. For this purpose the support is pivotally connected by a shaft 178 to a hand lever 179 pivoted at 179ª to the frame 124, the ends of the shaft 178 being engaged in arcuate slots 180 in the frame and adapted to be fixed in adjusted position by a lock-nut 181. In order to effect vertical adjustment of the knives by means of the support 167 the connection 164 of the lever 165 with the rod 158 and the lock-nut 181 are loosened, and the support together with the lever 165 and the rod 169 may be raised and lowered by swinging of the lever 179 to the desired position, the adjusted position being thereupon fixed by tightening the connection 164 and the nut 181.

The cam 161 for operating the cutter knives functions in both directions of movement of the cutter knife carrier, and in order to provide properly engaging irregular cam means for operation in both directions, the same is provided with a pair of opposed longitudinally spaced cam portions 182 and 183 and the cam is automatically shiftable at the ends of travel of the carrier to bring these respective portions into relation with the roller 160. For this purpose there is secured upon the forward side of the frame 114 a tubular sleeve 184 disposed at one side of the cam 161 and a tubular sleeve 185 disposed at the other side, the sleeve 185 being in spaced relation to the end of the cam in the position as shown in Fig. 9. Upon the upper side of this sleeve 185 there is secured a bracket 186 in which there is supported a spring pressed vertically movable plunger 187 engaging the surface of the cam 161 and adapted to cooperate with a semi-circular spiral slot 188 therein, for the purpose of shifting the position of the cam upon reversal of the direction of rotation of the shaft 92. During the operation of the carrier in one direction and as shown in Fig. 9, the sleeve 184 engages the end of the cam 161 and intermittently moves it forward upon the shaft 92 through the intermittent movement of the carrier, the plunger 187 being disposed at one end of the slot 188 so that during counter-clockwise rotation of the shaft the pin rides free about the cylindrical portion of the cam, merely entering the end of the slot at one point in the rotation of the cam. At the end of the travel of the carrier in one direction and upon reversal of the direction of drive of the shaft 92, that is in clockwise direction, the slot 188 acts as a cam upon the plunger 187 and shifts the cam 161, so that its end abuts the sleeve 185 and the cam portion 183 is brought into relation with the roller 160, the plunger thereupon riding free about the cylindrical surface of the cam in the manner as above described but at the opposite end of the slot 188.

The drive mechanism for the cutter knife carrier and the rotating supporting mandrel for the work is adapted to be automatically stopped at the end of the travel of the carrier in each direction, the machine being then started manually to start its operation in the opposite direction. For this purpose there is provided a horizontal slide rod 190 mounted at its ends in bearing portions 191 of the gear casing 22 and 192 of the cross head 15 of the standard 14, the same being provided with spaced adjustable mounted collars 193 and 194 disposed in the path of a stop arm 195 secured upon the frame 114, and adapted as the carrier reaches the end of its movement in one or the other direction to engage one of the collars 193 and 194 to thereby shift the rod 190. Upon the end of the rod 190 there is slidably keyed a rocker arm 196 held against longitudinal movement by means of a bracket 197 and pivotally connected at its end to a vertical rod 198, which is connected at its lower end to a clutch operating lever arm 199 secured upon the shaft 86.

There is secured upon the rod 190 at the inner side of the bearing 191 a cam block 200 provided at its under surface with spaced cam projections 201 and 202 disposed in opposite relation to each other, and with the underside of this cam there is engaged the upper rounded portion 203 of a vertical push rod 204 slidably mounted in a bracket 205 secured to the inner side of the standard 13. To the lower end of the rod 204 there is pivotally connected a rod 206 pivotally connected at its lower end to the latch lever 66. Upon the opposite ends of the cam block 200 there are secured radially extending arms 207 and 208 provided at their ends with inwardly projecting pins 209 and 210, and which are adapted to coperate with radially extending longitudinally spaced arms 211 and 212 secured upon a shaft 213 rotatable in a bearing portion 214 of the gear casing 22 and provided at its forward end with a gear 215 meshing with a gear 216 secured upon the continuously rotating shaft 92. The operation of this stop mechanism is as follows:

Assuming the parts to be in the position shown in Figs. 2, 5, 6 and the diagrammatic Figs. 11 and 12, the carriage travelling to the left (Fig. 6) through connection of the clutch 78. As the carriage reaches the end of its travel to the left, the arm 195 engages the collar 193 shifting the rod 190 together with the cam block 200 to a point where the arm 207 is in the path of the clockwise rotating arm 211, this arm engaging the pin 209 and rotating the block and shaft to the neutral position shown in Figs. 13 and 14. As the block 200 is shifted, the cam portion 201 is moved into alignment with the upper end 203 of the push rod 204, the cam portion 202 being moved out of alignment so that as the block is rotated the cam portion 201 depresses the push rod 204 and through the rod 206 trips the latch 66 releasing the pawl 65 and allowing the clutch 37 to be disengaged, the spring 63 at the same time applying the brake band 60 to stop rotation of the shaft 36. Simultaneously with this action the clutch 78 is disengaged, the two clutches 78 and 79 being neutralized by lifting of the rod 198 through movement of the lever arm 196 to the neutral position shown in Figs. 5, 13 and 14. The mandrel containing the cut belts is now removed and another mandrel carrying an uncut rubber tube is put in place. The machine is thereupon started to operate the carriage to the right by first engaging the clutch 37 through manually turning its hand lever 47, the clutch being retained in engaged relation through its latch 66, and thereafter manually engaging the clutch 79 through turning of the hand lever 89 in clockwise direction, this action raising the rod 198 and rotating the shaft 190 and the cam block 200 to the position shown in Figs. 15 and 16. As the carriage reaches the end of its travel to the right the arm 195 engages the collar 194 and shifts the shaft 190 and the cam block 200 to the position shown in Figs. 17 and 18, bringing the pin 210 of the arm 208 into the path of the arm 212, which, as it rotates in counter-clockwise direction, rotates the shaft 190, and the cam block 200 to the neutral position shown in Figs. 17 and 18 depressing the push rod 204 to release the clutch 37 and depressing the rod 198 to neutralize the clutches 78 and 79 and disengage the clutch 79, thereby stopping the machine.

The work to be cut into belts is mounted upon a cylindrical mandrel 217 adapted to be rapidly rotated by the drive shaft 36, and for this purpose there is provided upon the inner end of said drive shaft a cone head 218 adapted to engage one end of the mandrel 217 axially, and a dog 219 engaging an aperture 220 in the end of the mandrel and adapted to impart rotary movement to the same. At its other end, the mandrel is supported by means of a rotary spindle 221 having a removable cone head 222 adapted to be engaged axially with the end of the mandrel, and supported at its ends by roller bearings 223 and 224 in a tubular sleeve 225 supported in a tubular bracket 226 secured to the forward side of the standard 14. The sleeve 225 is fixed against rotation in the bracket 226 and is adapted to be longitudinally moved therein for the purpose of engaging and disengaging its cone head 222 with the end of the mandrel, and for this purpose said sleeve is provided at its upper side with a longitudinal rack 227 engaged by a pinion 228 disposed in an opening 229 of the bracket, and mounted upon a shaft 230 provided at its end with a hand wheel, 237.

In order to fix the adjusted relation of the spindle, it is provided at its lower side with a longitudinal ratchet 232 engaged by a pawl 233 slidably mounted upon a rod 234, said rod being pivotally connected at its end to a pin 235 in the hub 236 mounted on a shaft 236ª carrying a hand lever 231. The pawl is normally pressed forwardly against a transverse end pin 238 secured in the rod 234 by means of a spring 239, and is pressed into engagement with the ratchet 232 by means of a leaf-spring 240. This pawl is normally held out of engagement with the ratchet 232, by the engagement of its pin 241 with cam surfaces on flanges 242. The pawl serves as a means of locking the spindle against the end of the mandrel, and for this purpose it is first necessary to move the handle 231 in the direction of the arrow (Fig. 10). The pawl is moved forward to a point where the pin 241 rides upon the cam surface of the flange 242, and thereby the pawl is moved into engagement with the ratchet. Further movement of the handle compresses the spring 139 and increases the tension against the mandrel 217.

In order to disengage the cone head 222 from the spindle, the latter is threaded at its forward end, as at 243, and is provided with a nut 244 adapted to be turned forwardly to force the cone head out of its force fit with the spindle.

We have illustrated and described a preferred and satisfactory embodiment of the invention, but it will be obvious that changes may be made therein within the spirit and scope thereof as defined in the appended claims.

Having thus described our invention, what we claim and desire to secure by Letters Patent is:

1. In a belt cutting machine of the character described, a tube supporting mandrel, a carriage, one of said parts being movable longitudinally with respect to the other, means for intermittently feeding said movable part, a pair of rotary cutting knives carried by said carriage, said knives being disposed in different angular relation to the axis of the mandrel, and means for moving said knives into engagement with the tube on the mandrel.

2. In a belt cutting machine of the character described, a tube supporting mandrel, a carriage, one of said parts being movable longitudinally with respect to the other, means for intermittently feeding said movable part, a pair of rotary cutting knives carried by said carriage, said knives being disposed in different angular relation to the axis of the mandrel and in spaced radial relation, and means for moving said knives into engagement with the tube on the mandrel.

3. In a belt cutting machine of the character described, a tube supporting mandrel, a carriage, one of said parts being movable longitudinally with respect to the other, means for intermittently feeding said movable part, a pair of rotary cutting knives carried by said carriage, said knives being disposed in different angular relation to the axis of the mandrel and in spaced radial relation, and means for simultaneously moving said knives into engagement with the tube on the mandrel.

4. In a belt cutting machine of the character described, a tube supporting mandrel, a carriage, one of said parts being movable longitudinally with respect to the other, means for intermittently feeding said movable part, a pair of rotary cutting knives carried by said carriage, said knives being disposed in different angular relation to the axis of the mandrel and in spaced relation longitudinally of the mandrel, and means for moving said knives into engagement with the tube on the mandrel.

5. In a belt cutting machine of the character described, a tube supporting mandrel, a carriage, one of said parts being movable longitudinally with respect to the other, means for intermittently feeding said movable part, a pair of movable frames carried by said carriage pivotally mounted at spaced points, a rotary cutter knife carried by each of said frames, its axis of rotation being at right angles to pivotal axis of the frame, and means for moving said frames to engage the knives with the tube on said mandrel and whereby the successive cuts of one knife are in lines intersecting the successive cuts of the other knife.

6. In a belt cutting machine of the character described, a tube supporting mandrel, a carriage, one of said parts being movable longitudinally with respect to the other, means for intermittently feeding said movable part, a pair of movable frames carried by said carriage pivotally mounted at spaced points and disposed at each side of a vertical plane through the axis of said mandrel, a rotary cutter knife carried by each frame, its axis of rotation being at a right angle to the pivotal axis of the frame, and means for moving said frames to engage the knives with the tube at radially spaced points and whereby the successive cuts of one knife are in lines intersecting the successive cuts of the other knife.

7. In a belt cutting machine of the character described, a tube supporting mandrel, a cutter knife carriage movable longitudinally with respect to said mandrel, a pair of rotary cutter knives carried by said carriage and disposed at intersecting angles, a cutter knife drive motor for each of said knives, a drive spindle for said mandrel, forward and reverse drive means for intermittently feeding said carriage, stop means adapted to be actuated at the end of the movement of the carriage in either direction, and starting means for connecting said carriage feeding means to operate in reverse direction to the next preceding direction of feed.

8. In a belt cutting machine of the character described, a tube supporting mandrel, a cutter knife carriage movable longitudinally with respect to said mandrel, a driving spindle for said mandrel for rotating it in one direction, forward and reverse drive means for intermittently feeding said carriage, a pair of rotary cutter knives carried by said carriage and separate motor drive means for rotating said knives in both directions of feed of said carriage.

9. In a belt cutting machine of the character described, a tube supporting mandrel, a cutter knife carriage movable longitudinally with respect to said mandrel, a drive spindle for said mandrel for rotating it in one direction, forward and reverse drive means for intermittently feeding said carriage, a plurality of rotary cutter knives carried by said carriage, and a plurality of motors carried by said carriage adapted to individually rotate said knives respectively in the same directions in both directions of feed of said carriage.

10. In a belt cutting machine of the characters described, a tube supporting mandrel, a cutter knife carriage movable longitudinally with respect to said mandrel a pair of rotary cutter knives carried by said carriage and disposed at intersecting angles, a cutter knife drive motor for each of said knives, a drive spindle for said mandrel, change speed drive means for said spindle, means for intermittently feeding said carriage, and forward and reverse drive means for said intermittent carriage feed means adapted to be driven by said spindle.

11. In a belt cutting machine of the character described, a tube supporting mandrel, a cutter knife carriage movable longitudinally with respect to said mandrel a pair of rotary cutter knives carried by said carriage and disposed at intersecting angles, a cutter knife drive motor for each of said knives, a drive spindle for said mandrel, change speed drive means for said spindle, means for intermittently feeding said carriage, forward and reverse drive means for said intermittent carriage feed means adapted to be driven by said spindle, and change feed gearing for changing the length of feed of said carriage between cuts.

12. In a belt cutting machine of the character described, a tube supporting mandrel, a cutter knife carriage movable longitudinally with respect to said mandrel, a drive spindle for said mandrel, driving means for said spindle, a clutch between said drive means and said spindle, means for intermittently feeding said carriage, forward and reverse drive means for said intermittent carriage feed means adapted to be driven by said spindle, and clutch means for connecting one or the other of said forward and reverse drive means.

13. In a belt cutting machine of the character described, a tube supporting mandrel, a cutter knife carriage movable longitudinally with respect to said mandrel, a drive spindle for said mandrel, drive means for said spindle, a clutch between said drive means and said spindle, means for intermittently feeding said carriage, spaced beveled gears loosely rotatable on said spindle, a beveled gear meshing with said spaced beveled gears, clutch means for connecting one or the other of said spaced beveled gears to said spindle whereby said beveled gear is rotated in one or the other direction, and driving means between said beveled gear and said intermittent carriage feed means for driving the latter in one or the other direction as said beveled gear is rotated in one or the other direction.

14. In a belt cutting machine of the character described, a tube supporting mandrel, a cutter knife carriage movable longitudinally with respect to said mandrel, a drive spindle for said mandrel, drive means for said spindle, a Geneva movement mechanism for intermittently feeding said carriage, forward and reverse drive means for said intermittent carriage feed means adapted to be driven by said spindle, and clutch means for connecting one or the other of said forward and reverse drive means.

15. In a belt cutting machine of the character described, a tube supporting mandrel, a cutter knife carriage movable longitudinally with respect to said mandrel, a drive spindle for said mandrel, drive means for said spindle, means for intermittently feeding said carriage, forward and reverse drive means for said intermittent carriage drive means adapted to be driven by said spindle, clutch means for connecting one or the other of said drive means, and stop means adapted to be actuated at the end of the movement of the carriage in either direction to move said clutch means into neutral position whereby the feed of the carriage is stopped.

16. In a belt cutting machine of the character described, a tube supporting mandrel, a cutter knife carriage movable longitudinally with respect to said mandrel, a drive spindle for said mandrel, drive means for said spindle, a clutch between said drive means and said spindle, means for intermittently feeding said carriage, forward and reverse drive means for said intermittent carriage feed means adapted to be driven by said spindle, clutch means for connecting one or the other of said forward and reverse drive means, and stop means adapted to the actuated at the end of the movement of the carriage in either direction to disengage said first mentioned clutch and said last mentioned clutch means whereby the rotation of the mandrel and the feed of the carriage is stopped.

17. In a belt cutting machine of the character described, a horizontal tube supporting mandrel, a cutter knife carriage movable longitudinally with respect to said mandrel, a pair of rotary cutter knives carried by said carriage and disposed at intersecting angles, a cutter knife drive motor for each of said knives, a horizontal supporting slideway for said carriage, a horizontal feed screw engaging said carriage to impart longitudinal movement thereto, a drive spindle for said mandrel, drive means for said spindle, intermittent drive means for said screw adapted to impart step by step movement to said carriage, and forward and reverse drive means for said intermittent carriage drive means adapted to be driven by said spindle for imparting movement in forward and reverse directions to said carriage.

18. In a belt cutting machine of the character described, a tube supporting mandrel, a cutter knife carriage movable longitudinally with respect to said mandrel, a pair of rotary cutter knives carried by said carriage and disposed at intersecting angles and movable relatively thereto into and out of relation with said mandrel, a cutter knife driving motor carried by said carriage, drive means for continuously rotating said mandrel, intermittent feed means for said carriage, a cam shaft, means for continuously rotating said cam shaft, and cam means carried by said cam shaft adapted to move said cutter knife into and out of relation with said mandrel during the stationary periods of said carriage.

19. In a belt cutting machine of the character described, a tube supporting mandrel, a cutter knife carriage movable longitudinally with respect to said mandrel, a cutter knife carried by said carriage and movable relatively thereto into and out of relation with said mandrel, drive means for continuously rotating said mandrel in one direction, intermittent feed means for said carriage, a cam shaft, forward and reverse drive means for driving said intermittent feed means and said cam shaft whereby said cam shaft is rotated in one or the other direction as said carriage is moved in one or the other direction, and cam means carried by said cam shaft adapted to move said cutter knife into and out of relation with the mandrel during the stationary periods of said carriage.

20. In a belt cutting machine of the character described, a tube supporting mandrel, a cutter knife carriage movable longitudinally with respect to said mandrel, a pair of cutter knives carried by said carriage and movable with a relation to each other and into and out of relation with said mandrel, drive means for said mandrel, means for intermittently feeding said carriage, forward and reverse drive means for driving said intermittent feed means, a cam shaft adapted to be driven by said forward and reverse drive means, a slidable cam carried by said shaft and movable with said carriage, and means actuated by said cam adapted to move said cutter knife into and out of relation with the mandrel during the stationary periods of said carriage.

21. In a belt cutting machine of the character described, a tube supporting mandrel, a cutter knife carriage movable longitudinally with respect to said mandrel, a cutter knife carried by said carriage and movable relatively thereto into and out of relation with said mandrel, drive means for continuously rotating said mandrel in one direction, intermittent feed means for said carriage, a cam shaft, forward and reverse drive means for driving said intermittent feed means and said cam shaft whereby said cam shaft is rotated in one or the other direction as said carriage is moved in one or the other direction, slidable cam means carried by said shaft adapted to move said cutter knife into and out of relation with said mandrel during the stationary periods of said carriage, said cam means including forward and reverse cam portions adapted for respective operation in the forward and reverse directions of rotation of said shaft.

22. In a belt cutting machine of the character described, a tube supporting mandrel, a cutter knife carriage movable longitudinally with respect to said mandrel, a cutter knife carried by said carriage and movable relatively thereto into and out of relation with said mandrel, drive means for continuously rotating said mandrel in one direction, intermittent feed means for said carriage, a cam shaft, forward and reverse drive means for driving said intermittent feed means and said cam shaft whereby said cam shaft is rotated in one or the other direction as said carriage is moved in one or the other direction, slidable cam means carried by said shaft adapted to move said cutter knife into and out of relation with said mandrel during the stationary periods of said carriage, said cam means including longitudinally spaced forward and reverse cam portions adapted for respective operation in the forward and reverse directions of rotation of said shaft, and means adapted upon reversal of the direction of rotation of said shaft to shift said cam means to bring one or the other of said cam portions into operative relation.

23. In a belt cutting machine of the character described, a tube supporting mandrel, a cutter knife carriage movable longitudinally with respect to said mandrel, drive means for said mandrel, means for intermittently feeding said carriage, forward and reverse drive means for said intermittent feed means, clutch means for connecting one or the other of said forward and reverse drive means, stop means adapted to be actuated by said forward and reverse drive means to neutralize said clutch means, and means adapted to be actuated by said carriage at the end of its movement in either direction to operatively relate said stop means with said forward and reverse drive means.

24. In a belt cutting machine of the character described, a tube supporting mandrel, a cutter knife carriage movable longitudinally with respect to said mandrel, drive means for said mandrel, means for intermittently feeding said carriage, forward and reverse drive means for said intermittent feed means, clutch means for connecting one or the other of said forward and reverse drive means, clutch means adapted to be actuated by said forward and reverse drive means to neutralize said clutch means, and a longitudinally movable shift rod adapted to be shifted by said carriage at the end of its movement in either direction to operatively relate said stop means with said forward and reverse drive means.

25. In a belt cutting machine of the character described, a tube supporting mandrel, a cutter knife carriage movable longitudinally with respect to said mandrel, drive means for said mandrel, means for intermittently feeding said carriage, forward and reverse drive means for said intermittent feed means, clutch means for connecting one or the other of said forward and reverse drive means, stop means adapted to be actuated to neutralize said clutch means, a rotatable shift rod adapted to actuate said stop means, means driven by said forward and reverse drive means to rotate said shift rod, said carriage adapted at the end of its movement in either direction to shift said shift rod into operative relation with said last means.

26. In a belt cutting machine of the character described, a tube supporting mandrel, a cutter knife carriage movable longitudinally with respect to said mandrel, drive means for said mandrel, means for intermittently feeding said carriage, forward and reverse drive means for said intermittent feed means, clutch means adapted to be moved in one or the other direction to connect one or the other of said forward and reverse drive means, stop means adapted to be actuated to neutralize said clutch means, a rotatable shift rod adapted upon rotation in one or the other direction to actuate said stop means to clutch neutralizing relation, means driven by said forward and reverse drive means to respectively rotate said shift rod in one or the other direction, said carriage adapted at the end of its movement in one or the other direction to operatively relate said stop means with said means driven by said forward and reverse drive means.

27. In a belt cutting machine of the character described, a tube supporting mandrel, a cutter knife carriage movable longitudinally with respect to said mandrel, drive means for said spindle, a clutch for said drive means, means for intermittently feeding said carriage, forward and reverse drive means for said intermittent feed means, clutch means for connecting one or the other of said forward and reverse drive means, stop means adapted to be actuated by said forward and reverse drive means to disconnect said spindle clutch and neutralize said clutch means, and means adapted to be actuated by said carriage at the end of its movement in either direction to operatively relate said stop means with said forward and reverse drive means.

28. In a belt cutting machine of the character described, a tube supporting mandrel, a carriage, means for intermittently feeding said carriage longitudinally with respect to said mandrel, a frame carried by said carriage and movable relatively thereto toward and away from said mandrel, a pair of rotary cutter knives carried by said frame, a cutter knife motor carried by said carriage, spring means adapted to yieldably retain said frame in its moved position away from said mandrel, and cam means for intermittently moving said frame to engage the knife with the tube on the mandrel during the stationary periods of said movable part.

29. In a belt cutting machine of the character described, a tube supporting mandrel, a carriage, one of said parts being movable longitudinally with respect to the other, means for intermittently feeding said movable part, a pair of rotary cutting knives carried by said carriage, means for simultaneously moving said knives into engagement with the tube on the mandrel, and adjustment means adapted to be actuated to simutaneously adjust said knives in opposed directions to each other with respect to said mandrel.

30. In a ring cutting machine of the character described, a tube supporting mandrel, a carriage, one of said parts being movable longitudinally with respect to the other, means for intermittently feeding said movable part, a pair of adjustable cutting knives carried by said carriage, said knives being adapted to be disposed in different angular relation to the axis of the mandrel to cut belts of different cross section, and means for moving said knives into engagement with the tube on the mandrel.

Signed at Bridgeport in the county of Fairfield and State of Connecticut this 7th day of September A. D. 1926.

GUY L. HAMMOND.
LESTER HUBERT MESSINGER, Jr.